June 28, 1966 D. M. KING 3,257,963
CONVEYOR SYSTEMS

Filed Dec. 30, 1963 3 Sheets-Sheet 1

Inventor
Donald Mayer King
By Cushman, Darby & Cushman
Attorneys

June 28, 1966　　　D. M. KING　　　3,257,963
CONVEYOR SYSTEMS
Filed Dec. 30, 1963　　　3 Sheets-Sheet 3

Inventor
Donald Mayer King
By Cushman, Darby & Cushman
Attorneys

United States Patent Office 3,257,963
Patented June 28, 1966

3,257,963
CONVEYOR SYSTEMS
Donald Mayer King, Argyle Works, Stevenage, England
Filed Dec. 30, 1963, Ser. No. 334,528
7 Claims. (Cl. 104—96)

This invention relates to conveyor systems of the type wherein load carrying trolleys are propelled along a fixed trolley track by virtue of the engagement therewith of pusher dogs or driving abutments carried by a driving chain which is itself suspended from so-called chain trolleys adapted to run on a second track disposed vertically above the aforesaid trolley track.

It is the chief object of the invention to provide means whereby load carrying trolleys may be transferred to a conveyor of the type set forth from an auxiliary or branch line conveyor or vice versa.

According to the invention in a conveyor system of the kind set forth it is proposed, in a zone whereat transfer of load carrying trolleys from one conveyor to another is to be effected to arrange that the two conveyors shall extend parallel to each other and to provide in the load trolley tracks of each conveyor a movable section, said sections being so arranged that they may be moved together transversely with respect to the conveyors to bring one initially in alignment with one track into alignment with the other. Preferably the two track sections will be carried in appropriately spaced parallel relationship on a mobile frame or support structure arranged to move back and forth along a path extending transversely or at right angles to the direction of travel of the conveyors, there being means whereby said frame or support structure will be actuated automatically to perform a transfer operation as a result of the approach to the transfer zone of a free or empty pusher dog or driving abutment on the driving chain of that conveyor to which the load trolley is to be transferred.

Figure 1:
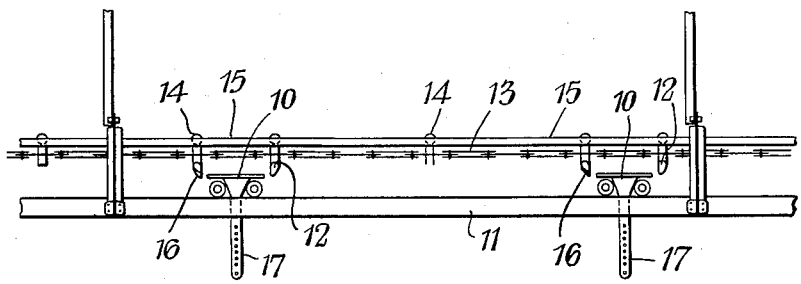
Figure 5:
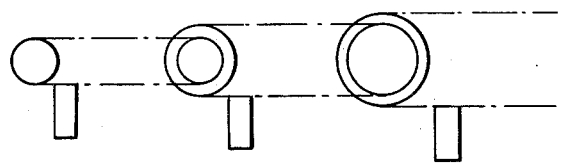
Figure 6:
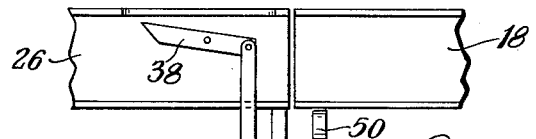
Figure 2:
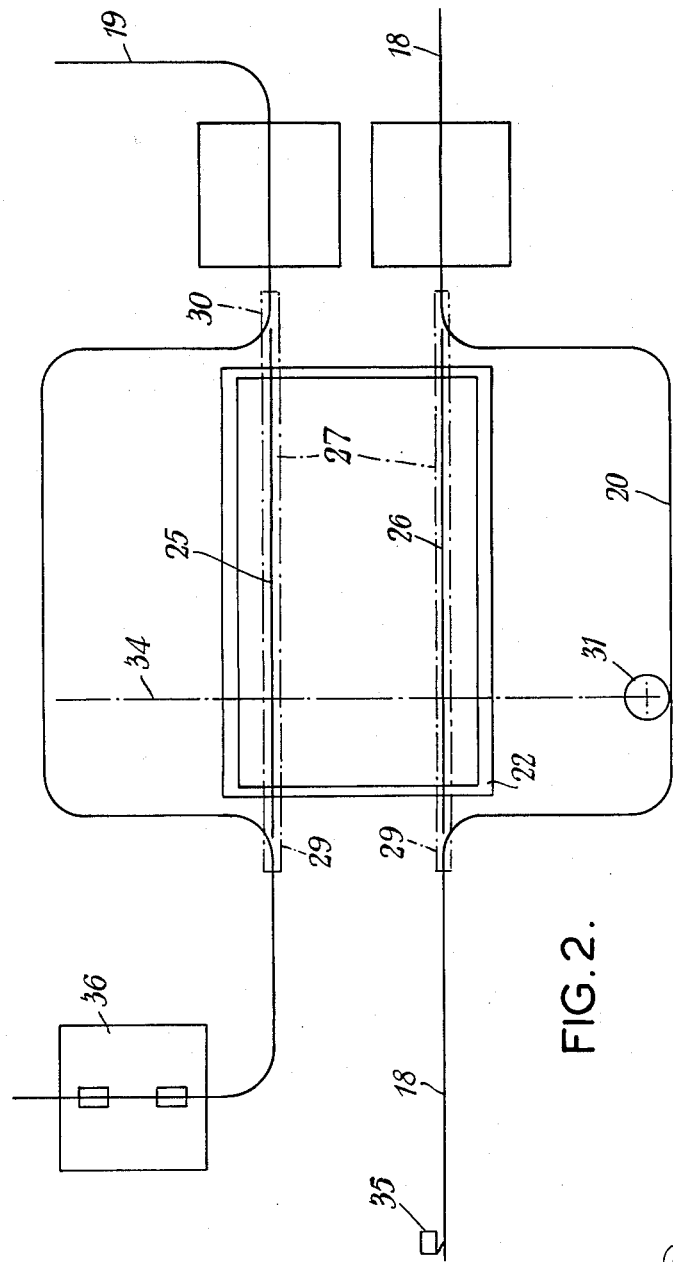
Figure 3:
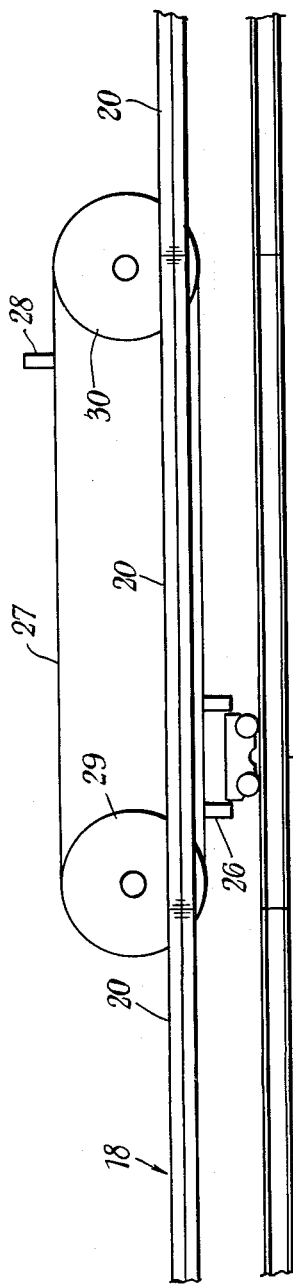
Figure 4:
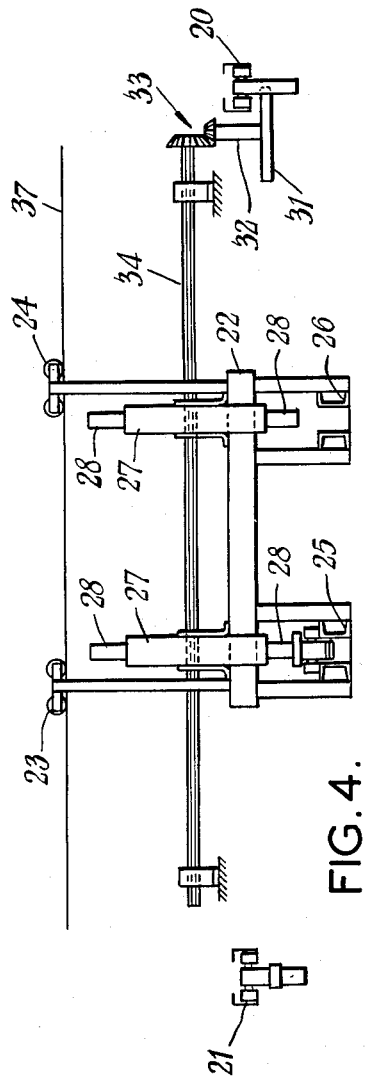

In order that the said invention may be clearly understood and readily carried into effect reference will now be made to the accompanying diagrammatic drawings in which:

FIGURE 1 shows a small portion of a conveyor and serves to illustrate the type of conveyor with which the invention is concerned, FIGURE 2 is a plan view illustrating the layout at a transfer zone, FIGURE 3 is a side elevational view of the transfer zone illustrated in FIGURE 2, FIGURE 4 is an end view looking from the left of FIGURE 2 and illustrating drive mechanism for booster conveyors employed in the transfer zone, FIGURE 5 illustrates a possible modification, FIGURE 6 is a fragmentary side elevation view on an enlarged scale of an exemplary stop or guard device to prevent load trolleys from rolling off a track section when the track section is not aligned with a conveyor track.

Referring now to FIGURE 1 it will be seen that the invention is concerned with a well known type of conveyor system wherein load carrying trolleys 10 are propelled along a fixed overhead track 11 by virtue of the engagement therewith of pusher dogs or abutments 12 which are associated with an endless driven chain 13 the latter being supported at spaced points along its length by means of so-called chain trolleys 14 which run on a second track 15 (hereinafter termed the chain track) disposed vertically above the trolley track 11. As will be seen the chain 13 is also equipped with so-called retainer dogs 16 which serve to prevent over-running of the trolleys 10 in the event that they are being moved along a downwardly inclined path. Each of the load trolleys 10 is provided with a depending load bar 17 from which loads to be transported are suspended. A conveyor system such as that briefly described above is well known and further description is not considered necessary.

In the present case it is proposed to provide a conveyor of the kind above described, such conveyor being hereinafter referred to as the main conveyor and to make provision at any selected point along such conveyor for the introduction of load carrying trolleys formerly present on an auxiliary or storage conveyor which is of the same general type as the main conveyor.

Referring now to FIGURES 2–4, 18 generally denotes the main conveyor while 19 generally denotes an auxiliary or storage conveyor. It will be seen particularly from FIGURE 2 that to allow for the required transfer of trolleys the trolley and chain tracks of the auxiliary that of the main conveyor. The spacing between the main conveyor 18 and at a point preceding that at which a transfer is required such tracks will be appropriately curved so that they will then follow a path parallel to that of the main conveyor. The spacing between the main and auxiliary conveyors 18, 19 will be such that there will be no possibility of loads present on one fouling loads on the other. At the point whereat transfer is to take place, hereinafter termed the transfer zone, the trolley tracks of both the main and auxiliary conveyors 18, 19 will be interrupted and the respective chain tracks indicated at 20, 21 will be diverted so that they (the two chain tracks) will by-pass the actual transfer zone. In the transfer zone there will be provided a mobile frame 22 so supported by means of suitably wheeled carriages 23, 24 from an overhead trackway 37 that it is capable of movement back and forth along a path extending transversely or at right angles to the main and auxiliary trolley tracks. Depending from the frame or support 22 structure are two trolley track sections 25, 26 disposed in spaced parallel relation, the spacing being such that with said frame or structure in its initial position one track section i.e. the section 25 will be aligned with the auxiliary trolley track while the second 26 will be aligned with the main trolley track. It is to be understood that the two track sections 25, 26 will, when in the aligned position, completely fill up the gaps or interruptions in the respective trolley tracks of the main and auxiliary conveyors 18, 19 so that when the frame 22 is in its initial position the trolley tracks of both conveyors will be virtually continuous or unbroken. The construction is such that when the frame or structure 22 is moved laterally or transversely with respect to the conveyors from its initial position the track section 25 formerly in register with the trolley track of the auxiliary conveyor 19 will be brought into register or alignment with the trolley track of the main conveyor 18.

Since the chain tracks and hence the driving chains of both the main and auxiliary conveyors 18, 19 are arranged to by-pass the transfer zone it will be necessary to provide some means for moving load carrying trolleys when present in such zone i.e. on to and from the track sections 25, 26 of the transfer mechanism. To this end a booster drive chain 27 comprising an endless chain having projecting pusher dogs 28 will be disposed above each of the track sections 25, 26 of the transfer mechanism. Each booster chain will pass around appropriately spaced terminal sprockets 29, 30 which will be carried by the frame or support structure and means will be provided for driving one sprocket of each chain as and when required. In the embodiment illustrated the drive to the booster chains 27 is derived from the drive chain of the main conveyor in the following manner. A toothed or other appropriate wheel 31 is arranged to mesh or engage with the driving chain of the main conveyor 18 so that it will be rotated as a result of the movement of the chain and thus impart a drive to a vertical shaft 32 which is drivingly connected via bevel gearing 33 with a shaft 34 extending transversely of the conveyors in the transfer zone, such transverse shaft 34 being disposed above the path of movement of said frame or structure but so mounted that while it is capable of free rotation there will be no endwise or longitudinal movement. Two of the sprockets of the aforesaid booster chains 27 (i.e. one in respect of each chain) will be splined on the aforesaid transverse shaft 34 so that while being driven thereby they will nevertheless be capable of slidable movement axially therealong as the frame or structure 22 is moved from one position to another.

It may be mentioned here that stops or other appropriate guard devices will be associated with the trolley tracks of both the main and auxiliary conveyors 18, 19 and also with the track sections 25, 26 such devices being operative when the track sections 25, 26 are out of alignment with the trolley tracks to prevent any possibility of load trolleys rolling off said tracks or track sections. Exemplary stop means are illustrated in FIGURE 6 wherein a pivotably mounted stop 38 positioned adjacent one end of the track section 26 pivots into an orientation which obstructs the track, under the influence of a weight 40 only when a roller 42, the means sensing alignment of the tracks, is not engaged with a ramp-like cam 50 positioned on the conveyor 18 adjacent the track section 26. Each of the above-mentioned stops or other appropriate guard devices may be similar and the specific construction shown in the figure forms no part of the present invention per se.

Furthermore at a point upstream of or preceding the transfer zone feeler or sensing means indicated at 35 will be provided adjacent the main conveyor line such means being operative to sense the approach of an empty or free pusher dog on the driving chain of the main conveyor 18. The feeler or sensing means will be operatively associated with means for effecting actuation of the frame or structure 22 so that as an empty or free pusher dog approaches the transfer zone such frame or structure will be actuated at the appropriate time to move transversely thereby to transfer a load trolley present thereon to the main conveyor 18. It will be appreciated that one of the wheeled carriages 23 or 24 associated with the frame 22 may incorporate a power drive unit which will be energised to effect movement of the frame on actuation of the sensing or pusher means 35. Alternatively the frame may be moved by a thruster or any other appropriate means.

Conveniently a suitable indexing or holding mechanism will be located in the auxiliary conveyor 19 and in FIGURE 2 such a mechanism is indicated at 36, its function being to feed a load trolley forwardly to the track section 25 of the transfer mechanism only when the latter is in position and capable of receiving it. The mechanism at the final holding or indexing station will be operatively connected to the transfer mechanism in any appropriate manner in order to ensure that there will be no possibility of a trolley being fed during such time as the frame 22 is away from its initial position or the appropriate track section is already occupied by a trolley awaiting transfer.

The apparatus described above is adapted to operate as follows:

Normally the mobile frame or structure 22 of the transfer mechanism will be in its initial position wherein the track sections 25, 26 are aligned one with the trolley track of the auxiliary conveyor 19 and the other with the trolley track of the main conveyor 18. At this time a load trolley for transfer may be fed to the track section 25 aligned with the trolley track of the auxiliary conveyor 19 and load trolleys will continue to be propelled along the main conveyor 18. Due to the fact that the drive chain 20 of the main conveyor 18 is diverted to by-pass the transfer zone, the load trolleys present on the main conveyor in the region of the transfer zone will be propelled therethrough by the appropriate booster chain 27. As an empty or free pusher dog on the drive chain of the main conveyor 18 approaches the transfer zone the feeler or sensing device 35 will actuate the transfer frame 22 thereby to cause the latter to move laterally at the appropriate time so that the track section 25 supporting the load trolley from the auxiliary conveyor will be brought into alignment with the trolley track of the main conveyor 18. Such transferred trolley will initially be propelled forwardly by the appropriate booster chain 27 on the transfer mechanism up to the point whereat the driving chain 20 of the main conveyor 18 returns to its position above the main conveyor trolley track at which point the free or empty pusher dog will contact the trolley and drive the same along the main conveyor 18. After such a transfer operation the mobile frame or structure 22 will be restored to its initial position in readiness to receive a further load trolley for transfer and for a further transfer operation.

It may be necessary to incorporate means which will be effective progressively to accelerate transferred trolleys so that by the time they are contacted by the pusher dog on the main conveyor they will be travelling at the same speed as the driving chain of the main conveyor. To effect such acceleration the booster chain 27 may in fact be replaced by an arrangement such as is illustrated in FIGURE 5 wherein a plurality of chains are arranged in alignment thereby to provide a succession of stages, the chain in each successive stage being driven at a faster speed than that of the preceding stage. The requisite speed change may as indicated in FIGURE 5 be effected by appropriate dimensioning of the sprocket wheels of the successive stages or alternatively by the interposition of suitable gearing between the sprocket wheels of said stages. Clearly it would also be possible to arrange in like manner for deceleration of trolleys approaching the transfer zone for transfer.

While in the foregoing reference has been made solely to the transfer of trolleys from an auxiliary or storage conveyor it will be appreciated that the mechanism could well be adapted to effect transfer in the reverse direction i.e. from a main conveyor to an auxiliary or branch conveyor. In such a case the booster conveyors would be driven from the driving chain of the auxiliary or branch conveyor, the drive means employed being similar to that hereinbefore described for transmitting a drive from the driving chain of the main conveyor. Further it would also be necessary to provide some feeler or sensing means corresponding to the means 35 but disposed adjacent the auxiliary or branch conveyor for the purpose of sensing the passage of a vacant pusher dog or abutment on the latter so as to effect appropriate operation of the frame or structure 22.

I claim:

1. A conveyor system including: a first conveyor comprising a first trolley track, an endless conveyor chain having pusher dogs, thereon and means for supporting and driving said endless conveyor chain adjacent said first trolley track; a second conveyor comprising a second trolley track, an endless conveyor chain having pusher dogs thereon and means for supporting and driving the last mentioned conveyor chain adjacent said second trolley track; said first and second trolley tracks arranged to receive trolleys each trolley being movable along one trolley track of said first and second trolley tracks at a time by engagement with the pusher dogs of the endless conveyor chain associated with said one trolley track; a transfer zone defined along said first and second conveyors wherein said first and second trolley tracks extend parallel to one another; said first trolley track in said transfer zone having a first movable track section adapted normally to extend in longitudinal alignment with adjacent ends of the remainder of said first trolley track thereby providing a continuous track; said second trolley track in said transfer zone having a second movable track section adopted normally to extend in longitudinal alignment with adjacent ends of the remainder of said second trolley track thereby providing a continuous track; means for selectively moving the first and second movable track sections together transversely with respect to adjacent ends of the remainder of said first and second trolley tracks to a first position to bring said first movable track section initially in alignment with said first trolley track into alignment with said second trolley track and to a second position to bring said second movable track section initially in alignment with said second trolley track into alignment with said first trolley track; the last mentioned means including a mobile support structure arranged to move back and forth along a path extending transversely of the direction of longitudinal extent of the first and second trolley track movable track sections; and further including sensing means sensitive to the approach to the transfer zone of an empty pusher dog on the conveyor chain of one of said first and second conveyors for actuating movement of said mobile support structure along said path to thereby effect a transfer of a trolley from the trolley track it is on to the other trolley track of said first and second trolley tracks for acceptance by said empty pusher dog.

2. A conveyor system as in claim 1 in which the sensing means include a sensing device disposed adjacent that conveyor to which the trolley is to be transferred at a point preceding the transfer zone, said sensing device being operative to sense the passage of an empty pusher dog and to transmit a signal to means capable of effecting the requisite movement of the support structure.

3. A conveyor system including: a first conveyor comprising a first trolley track, an endless conveyor chain having pusher dogs thereon, and means for supporting and driving said endles conveyor chain adjacent said first trolley track; a second conveyor comprising a second trolley track, an endless conveyor chain having pusher dogs thereon and means for supporting and driving the last mentioned conveyor chain adjacent said second trolley track; said first and second trolley tracks arranged to receive trolleys, each trolley being movable along one trolley track of said first and second trolley tracks at a time by engagement with the pusher dogs of the endless conveyor chain associated with said one trolley track; a transfer zone defined along said first and second conveyors wherein said first and second trolley tracks extend parallel to one another; said first trolley track in said transfer zone having a first movable track section adapted normally to extend in longitudinal alignment with adjacent ends of the remainder of said first trolley track thereby providing a continuous track; said second trolley track in said transfer zone having a second movable track section adapted normally to extend in longitudinal alignment with adjacent ends of the remainder of said second trolley track thereby providing a continuous track; means for selectively moving the first and second movable track sections together transversely with respect to adjacent ends of the remainder of said first and second trolley tracks to a first position to bring said first movable track section initially in alignment with said first trolley track into alignment with said second trolley track and to a second position to bring said second movable track section initially in alignment with said second trolley track into alignment with said first trolley track; the last mentioned means including a mobile support structure arranged to move back and forth along a path extending transversely of the direction of longitudinal extent of the first and second trolley track movable track sections; each movable track section having a booster conveyor associated therewith for propelling trolleys therealong.

4. A conveyor system as in claim 3 wherein each booster conveyor comprises an endless chain supported by means of appropriately spaced terminal sprockets; each booster conveyor endless chain carrying at spaced points along its length at least one outwardly directed projection adapted to function as a pusher dog; and means for driving the two endless chains from the conveyor chain of that conveyor to which the trolley is to be transferred.

5. A conveyor as in claim 4 in which one terminal sprocket of each booster conveyor is splined on a common shaft so that while being movable axially of such shaft said two sprockets will nevertheless rotate therewith and wherein the driving means also includes means for coupling the common shaft in rotative engagement with the driving shaft of the conveyor.

6. A conveyor system including: a first conveyor comprising a first trolley track, an endless conveyor chain having pusher dogs thereon and means for supporting and driving said endless conveyor chain adjacent said first trolley track; a second conveyor comprising a second trolley track, an endless conveyor chain having pusher dogs thereon and means for supporting and driving the last-mentioned conveyor chain adjacent said second trolley track; said first and second trolley tracks arranged to receive trolleys each trolley being movable along one trolley track of said first and second trolley tracks at a time by engagement with the pusher dogs of the endless conveyor chain associated with said one trolley track; a transfer zone defined along said first and second conveyors wherein said first and second trolley tracks extend parallel to one another; said first trolley track in said transfer zone having a first movable track section adapted normally to extend in longitudinal alignment with adjacent ends of the remainder of said first trolley track thereby providing a continuous track; said second trolley track in said transfer zone having a second movable track section adapted normally to extend in longitudinal alignment with adjacent ends of the remainder of said second trolley track thereby providing a continuous track; means for selectively moving the first and second movable track sections together transversely with respect to adjacent ends of the remainder of said first and second trolley tracks to a first position to bring said first movable track section initially in alignment with said first trolley track into alignment with said second trolley track and to a second position to bring said second movable track section initially in alignment with said second trolley track into alignment with said first trolley track; the last mentioned means including a mobile support structure arranged to move back and forth along a path extending transversely of the direction of longitudinal extent of the first and second trolley track movable track sections; one of the two conveyors from which trolleys are to be transferred being provided in a zone preceding the transfer zone with an indexing mechanism capable of holding trolleys in readiness for transfer, said indexing mechanism being actuable to release a trolley only when the appropriate movable track section is in position to receive it.

7. A conveyor system as in claim 3 in which guard devices are associated with both the trolley tracks of the two conveyors and with the movable track sections, such guard devices being operative, when said track sections are out of alignment with the trolley tracks, to prevent load trolleys rolling off said tracks and track sections.

References Cited by the Examiner

UNITED STATES PATENTS

| | | | |
|---|---|---|---|
| 761,484 | 5/1904 | Hetzel | 104—172 |
| 1,841,640 | 1/1932 | Schmidt et al. | 104—102 |
| 2,868,138 | 1/1959 | Bishop et al. | 104—88 |
| 2,875,704 | 3/1959 | Yates | 104—96 |

ARTHUR L. LA POINT, *Primary Examiner.*

MILTON BUCHLER, *Examiner.*

F. W. MONAGHAN, *Assistant Examiner.*